April 23, 1963  A. L. ZANOW  3,086,765
CUSHIONING DEVICE
Filed July 13, 1960

INVENTOR.
BY ANDREY L. ZANOW
Henry Kozak
ATTORNEY 3,086,765
CUSHIONING DEVICE
Andrey L. Zanow, Cleveland, Ohio, assignor to National Castings Company, a corporation of Ohio
Filed July 13, 1960, Ser. No. 42,718
6 Claims. (Cl. 267—63)

This invention relates to a resilient pad for use in shock cushioning mechanism and more particularly to a novel contour for the resilient cushion of the pad in order to more evenly distribute the flow of the resilient material of the cushion during compression of the pad. The invention is primarily adapted for and provides the greatest beneficial result when used in cushioning pads in which the resilient cushion comprises a curved or generally ring-like configuration.

Rubber compression pads of the conventional type for use in shock cushioning mechanism have, in the past, usually comprised a layer or cushion of rubber having, in vertical cross section, a generally symmetrical contour, and connected to or associated with a metal plate or insert. Favored designs of contour for cushioning pads for use in present railway shock absorbing mechanism are shown in U.S. Patents 2,656,182 issued October 20, 1953 to Donald Willison, and 2,686,667 issued August 17, 1954 to Donald Willison et al.

It has been found however that cushioning pads having, in vertical cross section, a generally symmetrical contour, as shown in the above identified patents, and especially in the ring-like or curved types of cushioning pad, a substantial uneven radial flow of rubber occurs during compression of the pad. This uneven flow of rubber causes localized areas of high stress to occur in the rubber and if the latter is bonded or vulcanized to the metal plate, bond failure sometimes occurs, thus giving a relatively short service life to the pad.

Moreover, in the type of shock cushioning arrangement wherein the pads are enclosed in a container or casing type structure, the radial flow of rubber during compression thereof may cause the latter to bulge outwardly into frictional contact with the adjacent surfaces of the casing, and considerable wear and related damage to the pads is liable to occur in operation of the mechanism.

Accordingly, the primary object of the invention is to provide a compression type resilient pad for shock cushioning mechanism having a cushion contour which causes the resilient material of the pad, during compression thereof, to flow in a manner to substantially obviate localized areas of high stress in the pad.

Another object of the invention is to provide a contour for a compression type resilient cushioning pad for shock absorbing mechanism and more especially a pad having a curved or ring-like cushion, wherein the resilient material of the pad will be caused to flow evenly during compression thereof without generally uneven bulging of the material occurring.

A more specific object of the invention is to provide a compression type pad for shock absorbing mechanism and in particular a pad having a generally curved or ring-like configuration comprising a metal plate to which is bonded a cushion of rubber having, in vertical cross-section, an asymmetrical contour whereby the rubber material of the pad flows evenly during compression thereof to thus prevent uneven radial bulging of the cushion, and resultant areas of comparatively high localized stress.

Figure 1:
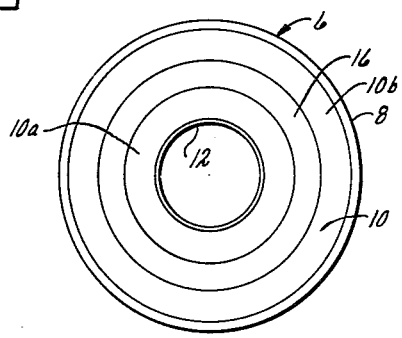
FIG. 1 is a top plan view of a conventional circular type compression pad for a shock absorbing mechanism having in vertical cross-section the presently employed symmetrical contour.
Figure 2:
FIG. 2 is a sectional side elevational view of the FIGURE 1 arrangement.
Figure 3:
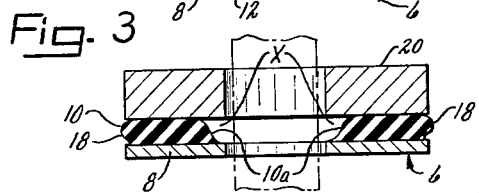
FIG. 3 is a sectional side elevational view similar to FIG. 2 but showing the flow and resultant uneven bulging of the rubber of the cushion having the aforementioned symmetrical contour upon compression of the pad.
Figure 7:
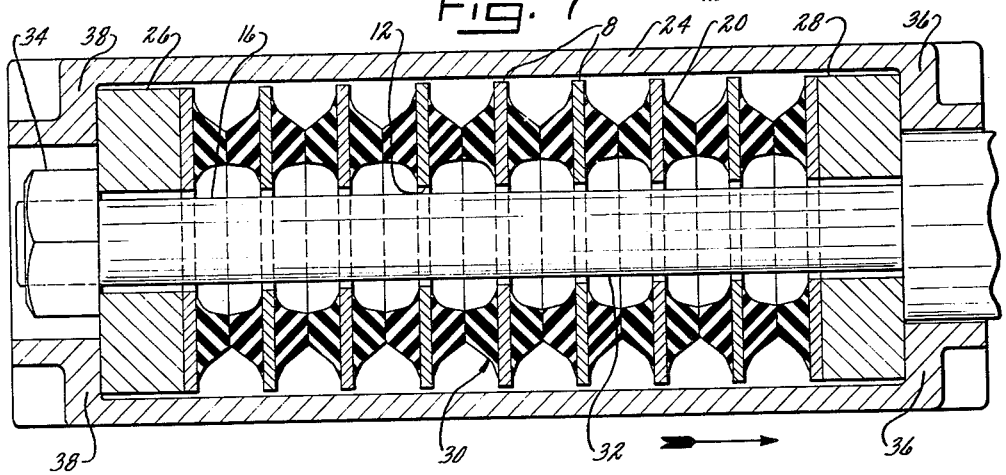
FIG. 7 is a sectional top plan view of a typical assembly of the improved pad having the asymmetrical contour, in a casing type shock absorbing mechanism.

Referring in particular to FIGS. 1, 2, 3 of the drawings there is shown a conventional circular compression type resilient pad 6, for use in shock absorbing mechanism having in vertical cross-section the usual symmetrical contour. The pad 6 comprises a metallic plate 8 to which is secured or bonded, in the embodiment shown, a symmetrical cushion or ring of resilient material 10. In the embodiment shown in FIGS. 1, 2 and 3, a cushion of resilient material is bonded to only one side of the metal plate but it will be understood that a rubber cushion could just as well be bonded or associated with both sides of the plate, as shown in FIG. 7 of the drawings. A central opening 12 is provided in plate 6 for receiving bolt means for connecting the pads to the other parts of a shock absorbing mechanism as will be hereinafter described in more detail.

It will be seen from FIG. 2 that the inner and outer sides 10a and 10b of the rubber cushion 10 converge upwardly from plate 8 at substantially the same angle and merge with the top, substantially flat working surface 16 of the pad.

In FIG. 3 the symmetrically contoured pad is shown subjected to a compressive force by means of a follower 20 and it will be noted that the rubber material flows radially outwardly with respect to the vertical center line of the pad to bulge as at 18 beyond the outer extremity of plate 8. This uneven flow and resultant bulging of the rubber produces localized areas of high stresses in the bond between the rubber cushion and the plate with resultant damaging effects to the bond. Moreover, if the pad is used in the type of shock absorbing mechanism having an outer casing or housing as shown in FIG. 7, the bulging portions 18 of the rubber cushion may frictionally engage the sides of the casing during operation of the mechanism and result in a high rate of wear of the rubber and a short service life for the pad. Furthermore, it will be observed that with the type of pad shown, unused flow space X exists between the inner side 10a of the cushion and the aforementioned bolt means (shown in dot-dash) and thus inefficient use is made of the available flow space during compression of the pad.

Figure 8:
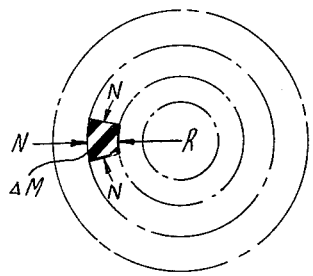
FIG. 8 is a diagrammatic view illustrating the forces acting on the conventional type pad having a generally symmetrical contour which thus produces the above-mentioned uneven flow of the resilient material and areas of high localized stress in the pad.

The reason for the uneven flow of rubber in a generally symmetrically contoured pad is illustrated in FIG. 8 where a portion delta M of the rubber cushion of the pad (illustrated in phantom lines) is shown subjected to forces N which act normal or perpendicular to the sides of portion delta M of the cushion upon compression of the pad. The resultant force R of forces N acts radially outwardly from the vertical axis of the pad as shown to cause uneven flow and outward bulging of the resilient material of the cushion. If the pad is of the type shown having an opening 12 therein, it will be seen from FIG. 3 that a substantial portion of the available space X between the extremity of the opening and the inner side 10a of the cushion is wasted during compression of the pad.

Figure 4:
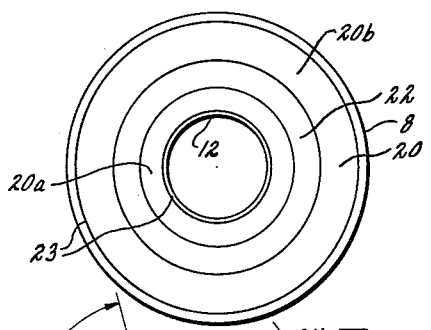
FIG. 4 is a top plan view of a circular type pad similar to FIG. 1 but embodying the asymmetrical contour of the present invention.
Figure 5:
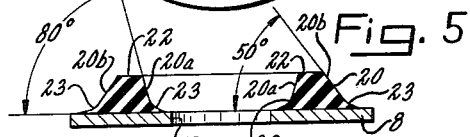
FIG. 5 is a sectional side elevational view of the FIG. 4 arrangement.
Figure 6:
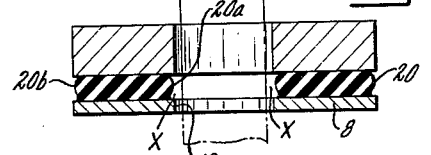
FIG. 6 is a sectional side elevational view similar to FIG. 5 but showing the flow of the rubber of the pad having the asymmetrical contour without any substantial uneven bulging, during compression thereof.

FIGS. 4 to 6 inclusive illustrate a resilient pad embodying, in accordance with the invention, the novel asymmetrical contour to more evenly distribute the flow of the resilient material of the cushion and thereby provide a longer wearing and more effectively operating pad.

As can be best seen from FIGS. 4 and 5 of the drawings, the novel pad comprises plate 8 to which is bonded cushion 20 and which has a central opening 12. In the embodiment shown, cushion 20 is a ring-like ridged configuration which extends in vertical cross-section substantially from the outer edge of the plate to the periphery of opening 12 in the plate. The inner and outer sides 20a and 20b of the cushion converge upwardly at substantially different angles, with the inner side 20a of the cushion, in the embodiment shown, being generally disposed at an acute mean angle of approximately 80 degrees to the plane of the plate. The outer side 20b of the cushion, in the embodiment shown, slopes upwardly at an acute mean angle of approximately 50° to the plane of the plate. Accordingly, the inner side 20a of the cushion is sloped more steeply than the outer side 20b thereof. In the embodiment shown, the slope of inner side 20a of the cushion is approximately 1.6 times the slope of the outer side of the cushion. At their outer ends, sides 20a and 20b merge with substantially flat, top or outer working surface 22 of the cushion. Surface 22 is adapted for abutting engagement with the corresponding surface on an adjacent pad when the pads are in assembled condition in a shock cushioning mechanism. At their inner ends, the sides of the pad are sloped gradually to the surface of the plate as at 23 to aid in eliminating high stress concentrations along the peripheral edges of the rubber and thus protect the bond between the plate and the cushion.

As can be best seen in FIG. 4, a greater portion of the ridged cushion 20 is disposed nearer to the periphery of opening 12 in the plate than to the outer edge of the plate. Thus, upon compression of the pad (FIG. 6), a more even flow of the rubber occurs thereby eliminating uneven, outward bulging of the cushion. This substantially even flow of rubber more effectively utilizes the available space X between the aforementioned bolt means (shown in dot-dash) and the inner side 20a of the cushion and, as will be understood by those skilled in the art, a pad is produced which can be compressed a greater amount than previous pads since, the reduced bulging results in reduced bond stress and less chance of wear between the pad and the associated parts of the mechanism in which the pad is used. Thus the improved asymmetrical pad has a greater capacity than previously employed symmetrical pads having a cushion of comparable volume.

FIG. 7 illustrates a typical shock absorbing mechanism of the casing type utilizing cushioning pads embodying the present invention. The mechanism broadly comprises an outer casing or housing 24, front and rear follower members 26 and 28, a group 30 of rubber cushioning pads of the above described asymmetrical type embodying the invention, and a bolt and nut thrust transmitting means. The bolt 32 extends through the aforementioned openings 12 in the plates 8 of the pads and is secured to the group 30 of pads by means of nut 34. Upon application of a force in the direction of the arrow shown in FIG. 7, the follower 26 is moved inwardly by the bolt to compress the group of pads 30 and cushion the shock, follower 28 remaining stationary because of its engagement with shoulders 36 on the casing. When a force is applied to the mechanism from the opposite direction, follower 26 remains stationary because of its engagement with shoulders 38 on the casing and follower 28 is moved inwardly to compress the group of pads and cushion the impact. With the more uniform flow of rubber of the pads embodying the asymmetrical contour of the invention, less outward bulging of the rubber of the pads occurs and thus frictional engagement between the rubber cushions and sides of the casing is less liable to be produced, thus resulting in a longer wearing and more economically maintained shock absorbing mechanism.

While certain values for the angles at which the outer and inner sides of the resilient cushion are sloped to the metal plate of the pad have been indicated above, it will be understood that these specific values are not necessarily critical for utilization of the invention. The particular mean angles at which the outer and inner sides of the cushion should be sloped will be determined from the specific service conditions to which the pads are to be subjected and the desired operating characteristics of the shock cushioning mechanisms in which the pads are used.

From the foregoing description and accompanying drawings it will be readily understood that the invention provides a novel contour for a cushioning pad and especially a pad embodying a resilient cushion having a curved configuration, which provides a more uniform flow of the resilient material of the cushion during compression of the pad and results in less outward bulging of the cushion and a reduction in the stresses occurring therefrom.

The terms and expressions which have been employed herein are used as terms of description and not of limitation and there is no intention of excluding such equivalents of the invention described or of portions thereof as fall within the purview of the claims.

What is claimed is:

1. A cushioning pad for shock cushioning mechanism, comprising a plate having a resilient cushion associated with at least one side thereof, said plate having an opening therethrough, said cushion encircling said opening and in vertical cross-section extending substantially from the periphery of said opening to the outer edge of said plate, the inner and outer sides of said cushion being sloped so as to converge in a direction away from said plate, said cushion having a greater portion thereof disposed nearer said opening than at the outer edge of said plate.

2. A cushioning pad for shock cushioning mechanism, comprising a metal plate having a rubber cushion bonded to at least one side thereof, said plate having a generally centrally disposed opening therein, said cushion being of ring-like configuration and encircling said opening, said cushion having a substantially flat outer end surface, the inner and outer sides of said cushion sloping upwardly from said plate and merging with said surface, said inner side of said cushion being more steeply sloped than said outer side relative to said plate.

3. A cushioning pad in accordance with claim 2 wherein the slope of said inner side of said cushion is approximately 1.6 times the slope of said outer side.

4. A cushioning pad in accordance with claim 2 wherein said inner side of said cushion is sloped at an angle of approximately 80 degrees to the plane of said plate and said outer side is sloped at an angle of approximately 50 degrees to the plane of said plate.

5. In shock cushioning mechanism comprising in combination an outer casing member and a series of transversely extending aligned cushioning pads disposed in close proximity to the sides of said casing, each of said pads comprising a plate member and a resilient cushion associated with at least one side of said plate, said cushion being of ring-like configuration with the outer and inner sides being sloped so as to converge in a direction away from said plate, said inner side of said cushion being sloped at a greater angle with respect to said plate than said outer side whereby said cushion is prevented from bulging radially into engagement with said casing upon compression of said mechanism.

6. In a shock cushioning mechanism in accordance with claim 5 wherein said cushion is bonded to said plate and the outer end of said cushion comprises a substantially flat abutment surface.

References Cited in the file of this patent

UNITED STATES PATENTS

| | | |
|---|---|---|
| 2,656,182 | Willison | Oct. 20, 1953 |
| 2,665,902 | Allen | Jan. 12, 1954 |
| 2,686,667 | Willison et al. | Aug. 17, 1954 |
| 2,944,492 | Clejan | July 12, 1960 |

FOREIGN PATENTS

| | | |
|---|---|---|
| 4,059 | Great Britain | of 1912 |
| 506,975 | Great Britain | June 7, 1939 |
| 462,294 | Italy | Mar. 7, 1951 |